Oct. 23, 1956     R. L. HOLLOWAY ET AL     2,767,983
BOWLING PIN ELEVATING MECHANISM
Filed March 17, 1950     7 Sheets-Sheet 1
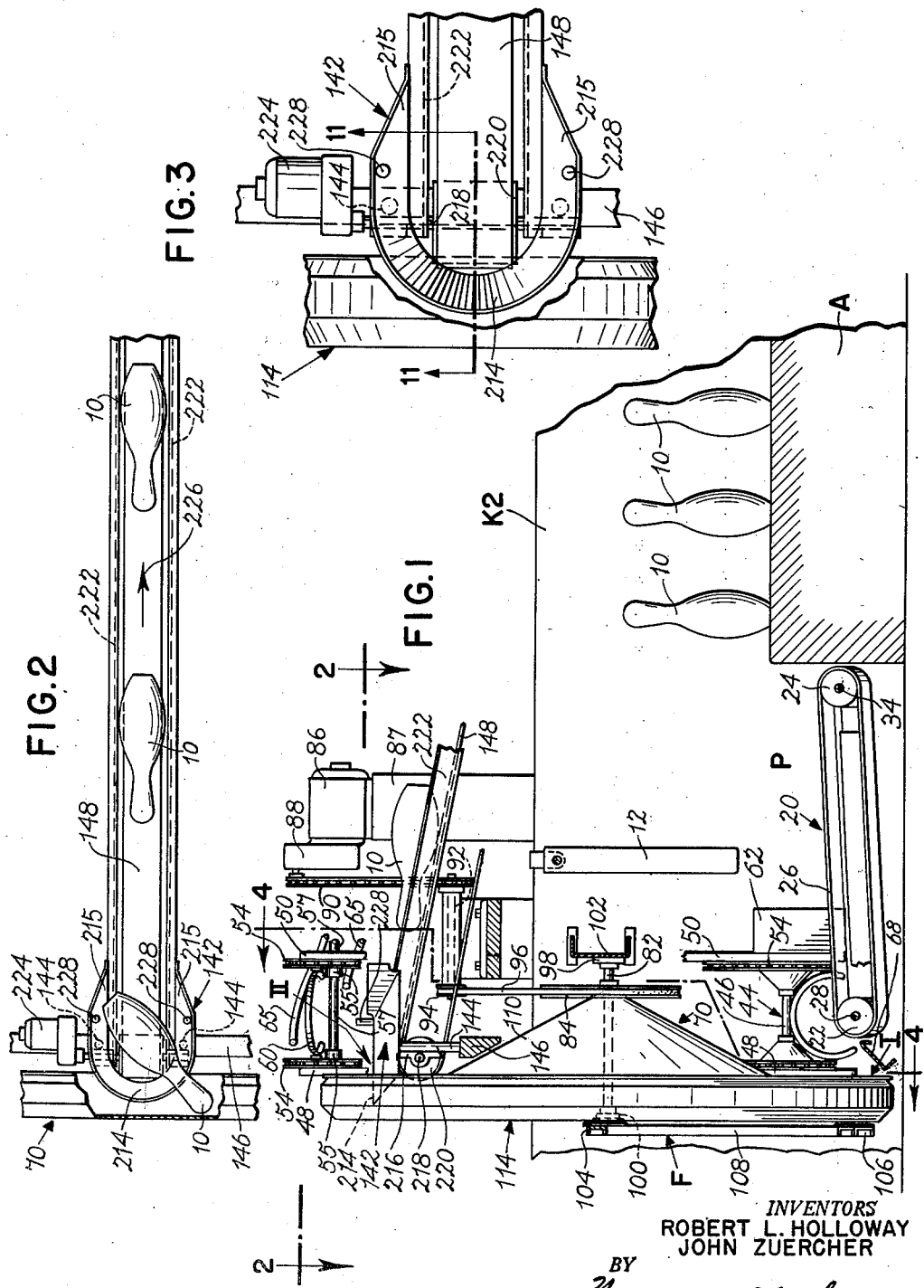
INVENTORS
ROBERT L. HOLLOWAY
JOHN ZUERCHER
BY
Wentworth A. Clapham
Attorney.

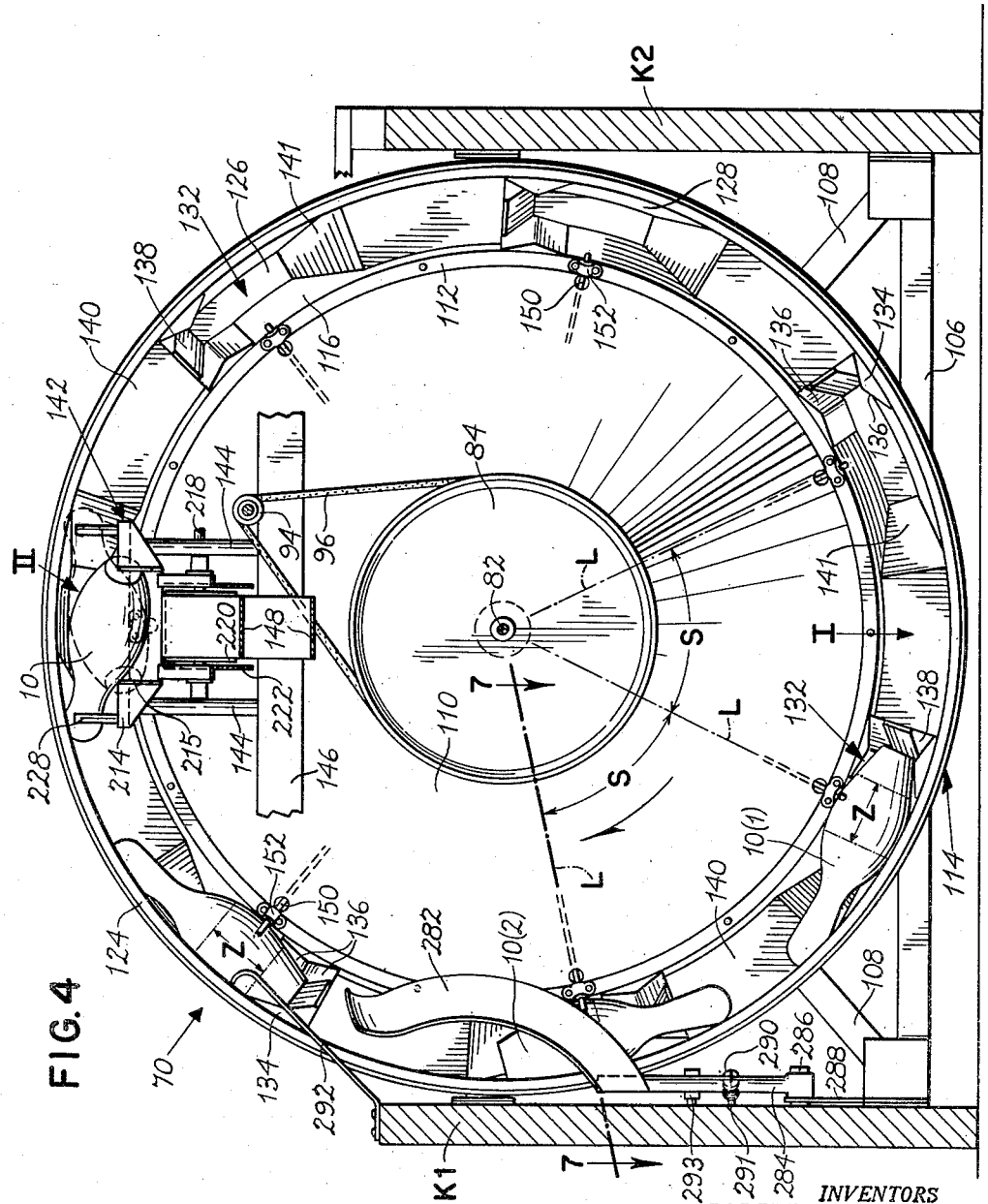

Oct. 23, 1956  R. L. HOLLOWAY ET AL  2,767,983
BOWLING PIN ELEVATING MECHANISM
Filed March 17, 1950  7 Sheets-Sheet 3
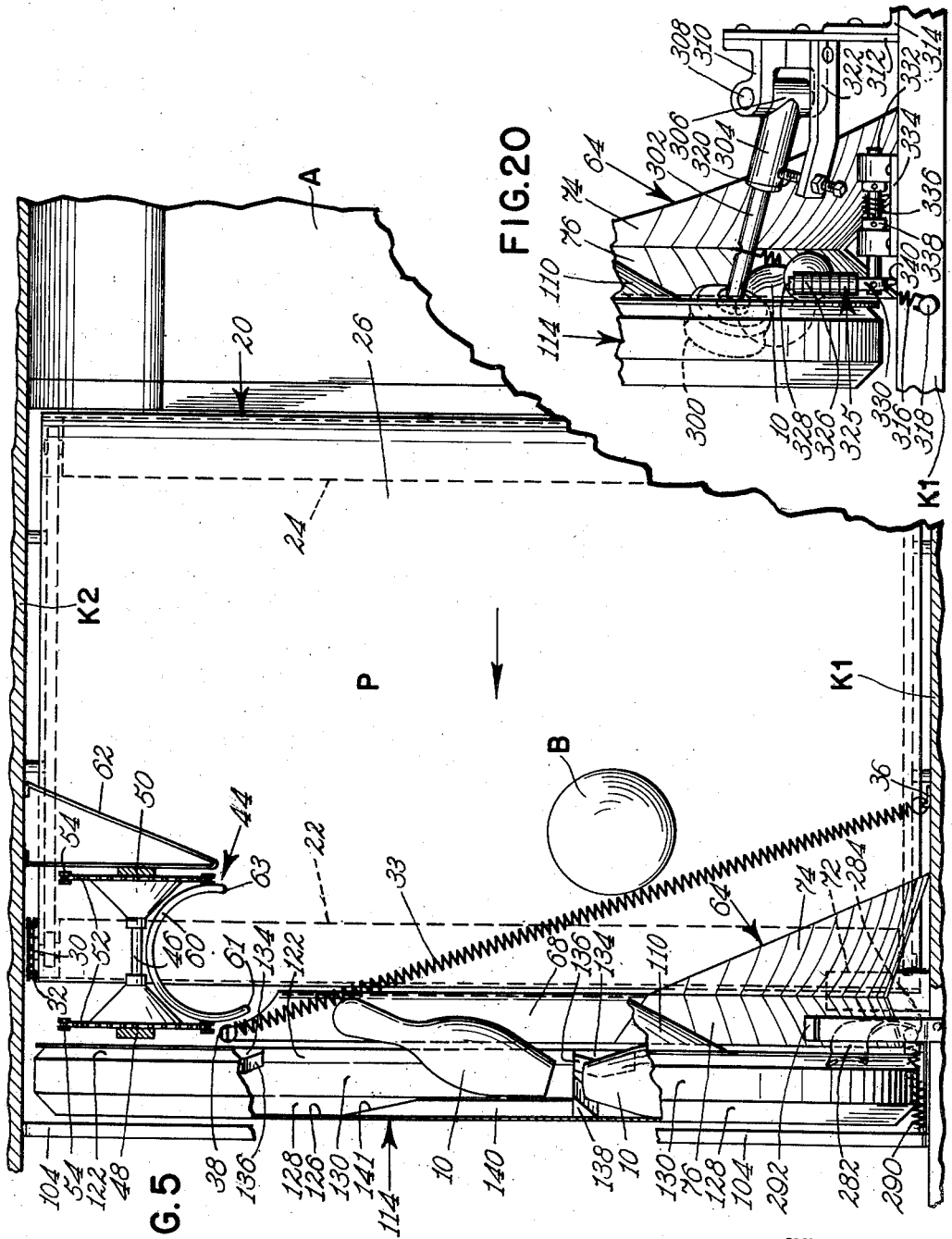
INVENTORS
ROBERT L. HOLLOWAY
JOHN ZUECHER
BY
Wentworth G. Clapham
Attorney.

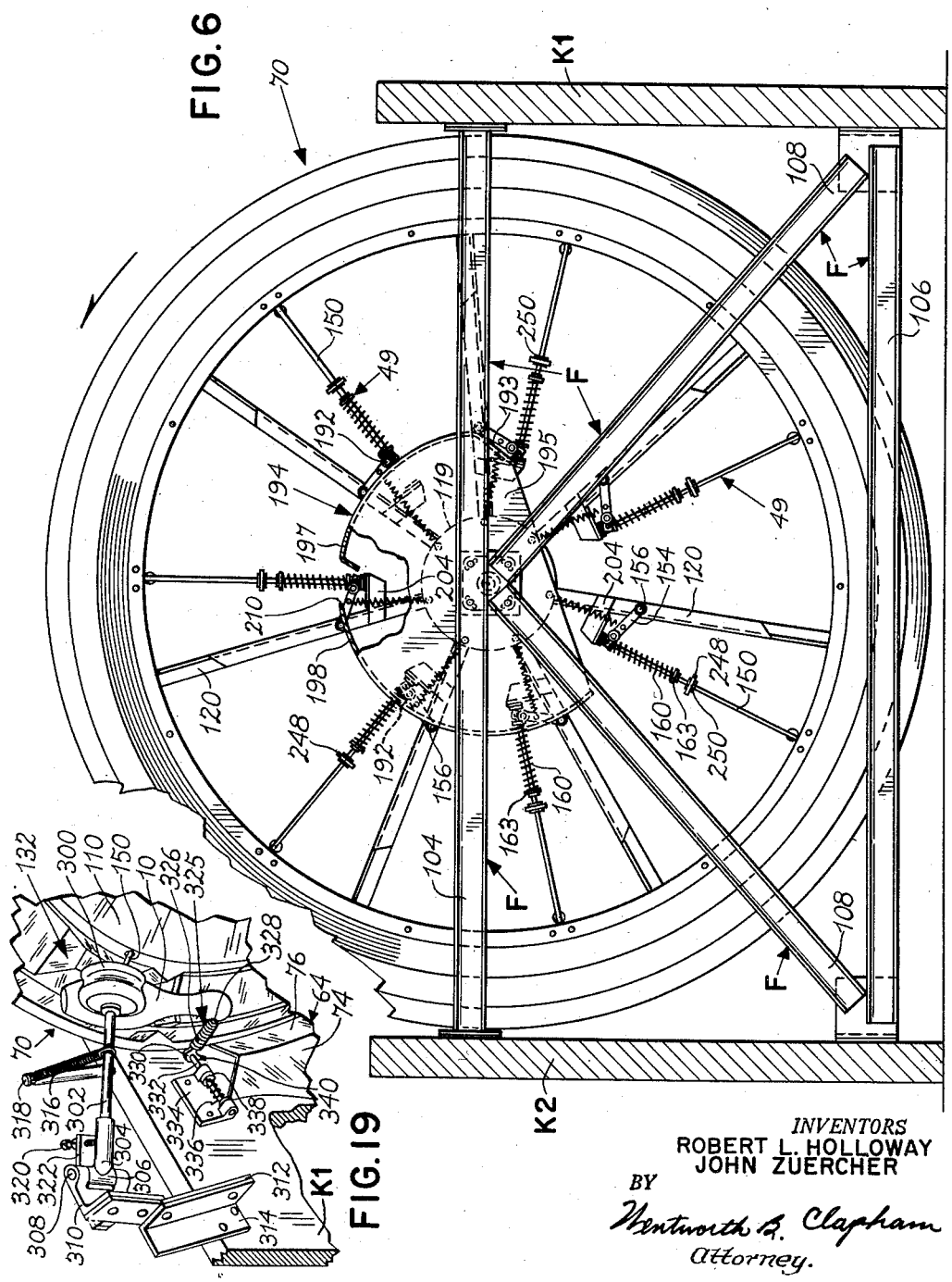

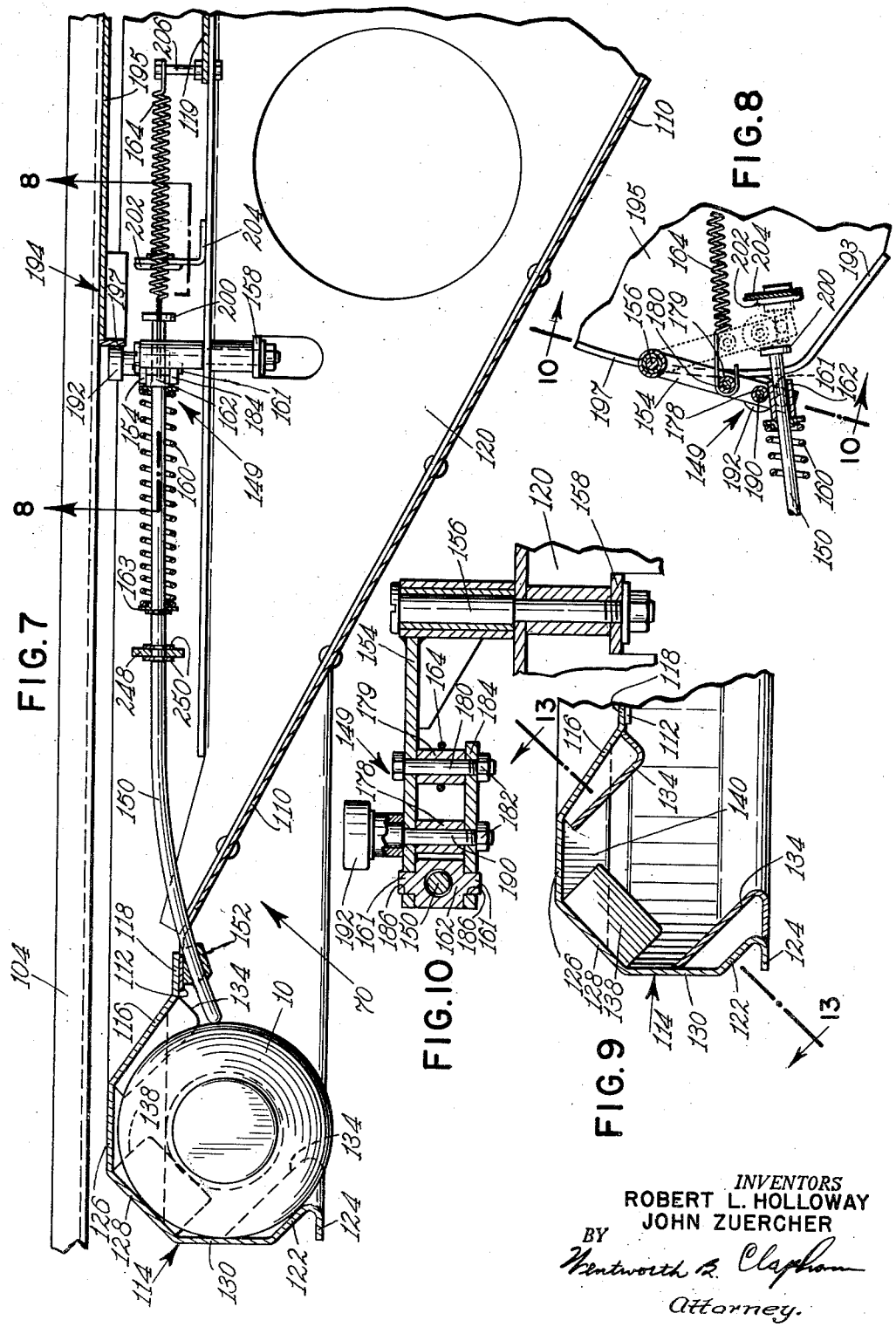

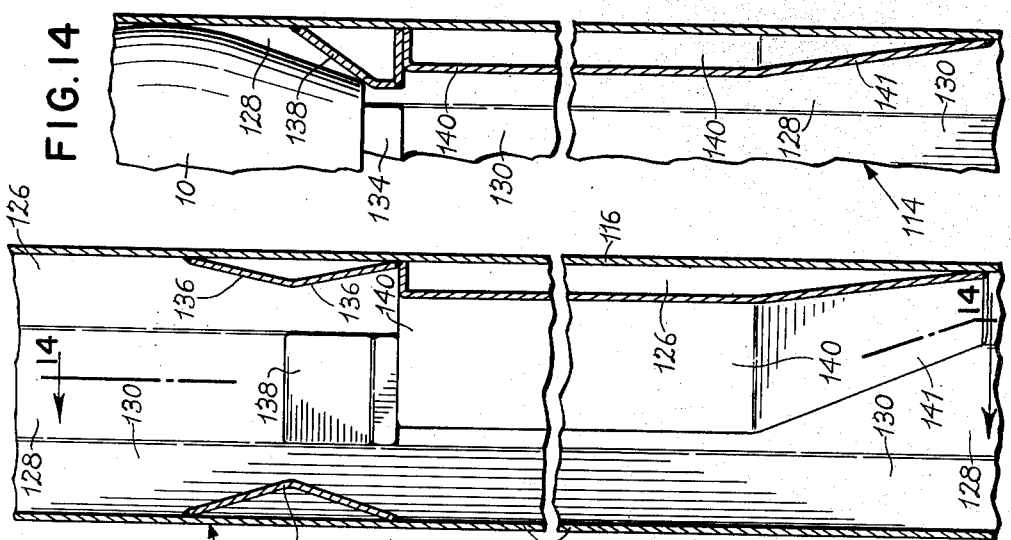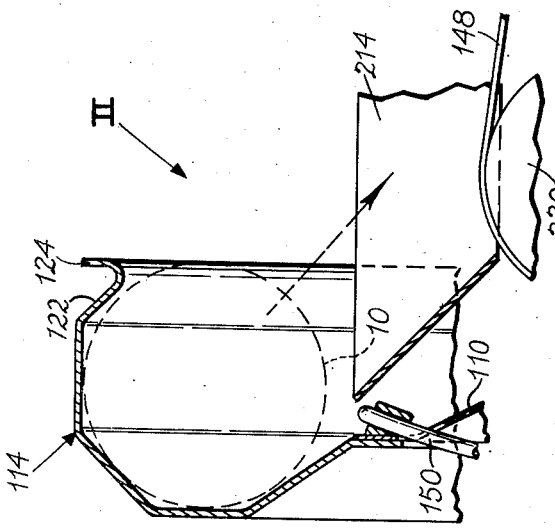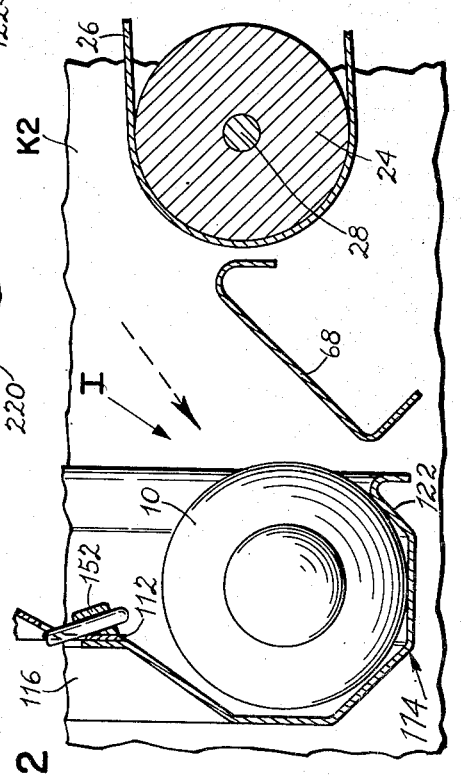

Oct. 23, 1956  R. L. HOLLOWAY ET AL  2,767,983
BOWLING PIN ELEVATING MECHANISM
Filed March 17, 1950  7 Sheets-Sheet 7
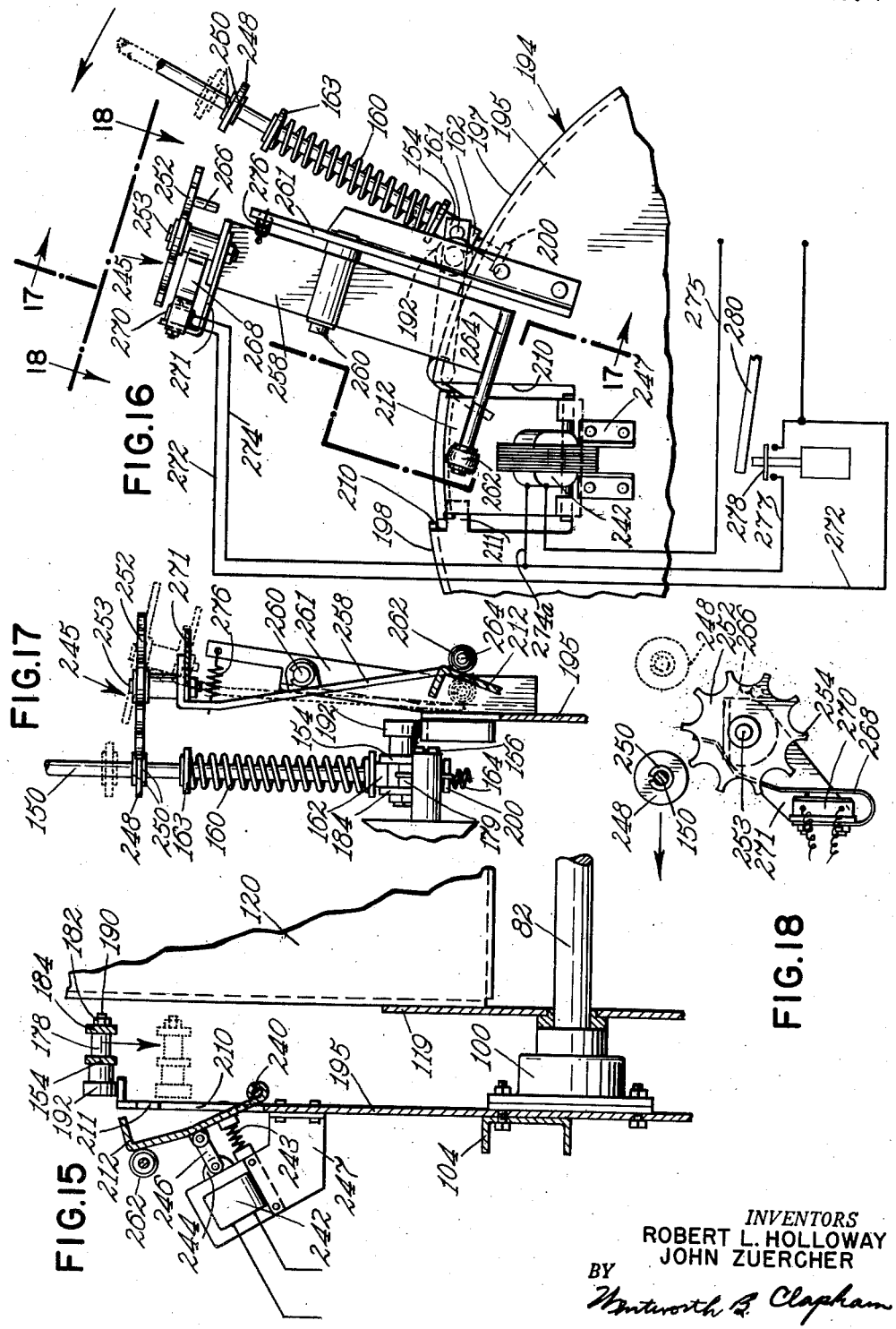
INVENTORS
ROBERT L. HOLLOWAY
JOHN ZUERCHER
BY
ATTORNEY

United States Patent Office 2,767,983
Patented Oct. 23, 1956

2,767,983

BOWLING PIN ELEVATING MECHANISM

Robert L. Holloway, Snyder, and John Zuercher, Buffalo, N. Y., assignors to American Machine & Foundry Company, a corporation of New Jersey Application March 17, 1950, Serial No. 150,232

41 Claims. (Cl. 273—43)

This invention relates to bowling pin spotting machines and more particularly to improvements in mechanism for removing bowling pins from the pit of a bowling alley and elevating them to a point of discharge above the pit where pins are discharged into a pin aligning device for aligning and transfer to pin distributing mechanism for ultimate delivery to a bowling pin spotter.

In bowling pin spotting machines, and in particular automatic bowling pin spotting machines, it is desirable that bowling pins falling into the pit of a bowling alley be removed as quickly as possible therefrom and delivered to a pin spotter which will spot them on a bowling alley in order that the play of a game can continue with as little interruption as possible. In most devices provided heretofore for this purpose, bowling pins have been subjected to hard usage in handling and in being conveyed to the pin spotter. The purpose of the present invention, therefore, is to effect the removal of pins from the pit of a bowling alley and their delivery in aligned arrangement to a pin distributor with a minimum of wear and tear and a substantial minimization of noise during this handling of pins.

According to the present invention, bowling pins are delivered from the pit of a bowling alley to a bowling pin handling and conveying mechanism in which each pin placed or delivered into the mechanism is firmly held during its transfer from the pit of the alley to a point substantially above, where it is released, aligned and discharged into a distributing device for transfer to a pin spotter.

The present invention also is directed towards the solution of the problem of providing the least possible restriction to the path of movement of each bowling pin to be handled by the elevating mechanism. This is effected by the use of little or no restrictions or confinements of the area through which each bowling pin is transported or delivered from the pit into the pin elevating mechanism.

The invention further consists in the provision of means for so controlling the cyclic operation of the pin elevating member that only a predetermined number of pins is discharged therefrom for alignment and distribution, and when such number of pins has been discharged, subsequent pins delivered into the pin elevating member are selectively retained therein for future discharge when in the course of play of the game the necessity of delivering pins to the aligning and distributing means arises.

The invention also consists in the provision of improved means for separating bowling balls from pins in the pit of a bowling alley with which the invention is employed in order that balls may be returned rapidly to the player and will not interfere with the delivery of pins into the pin elevating member for elevation, alignment and distribution.

It is a further object of the invention to provide means for counting the proper number of pins delivered to the pin spotting machine, which according to general practice, is ten pins, and pins in excess of those required to fill the pin spotter are retained in the pin elevating member until such time as the needs of the pin spotting machine require the release of pins held in the pin elevating mechanism for delivery thereby into the pin aligning and distributing members associated therewith.

The invention is further characterized by the provision of pin carrying and forwarding units such as spaced circumferential pockets about the circumference or in the periphery of the rotary pin elevating member, and pin holding means associated with each pocket for firmly holding a bowling pin in a pocket as it travels from the pit of a bowling alley upwardly to a point of discharge into a pin aligning mechanism. The invention also consists in the provision of a pin counting device associated with the pin elevating member and a selectively operated mechanism controlled by the counting device for effecting the rotation or release of pins from the several pockets in the rotary pin elevating mechanism in accordance with the requirements of the pin spotter for pins.

With these and other objects not specifically mentioned in view, the invention consists in certain combinations and constructions which will be fully described hereinafter, and then set forth in the claims hereunto provided.

In the accompanying drawings, which form a part of the specification, and illustrate a preferred embodiment of the invention, and in which like characters of reference indicate the same or like parts:

Figure 1 is a side elevation showing a preferred embodiment of the invention;

Figure 2 is a plan view partly in section taken on line 2—2 of Fig. 1 showing pin receiving and aligning mechanism;

Figure 3 is an enlarged view of a detail of Figure 2;

Figure 4 is a front view of the rotary pin elevating mechanism taken approximately on line 4—4 of Figure 1;

Figure 5 is a partial plan view of the mechanism shown in Figure 4, parts being broken away and omitted for clearness, illustrating the manner in which bowling pins are delivered onto the rotary pin elevating mechanism;

Figure 6 is a rear view of the mechanism disclosed in Figure 4;

Figure 7 is a sectional view taken on line 7—7 of Figure 4 showing one of the pin holding units;

Figure 8 is a view taken on line 8—8 of Figure 7;

Figure 9 is an enlarged transverse sectional view of a detail of the pin carrying channel of the pin elevating device;

Figure 10 is a sectional view taken on line 10—10 of Figure 8;

Figure 11 is a sectional side elevation taken on line 11—11 of Figure 3 of a part of the pin elevating member of the invention showing the manner in which pins are discharged from the rotary pin elevating member for alignment and delivery to a pin distributor.

Figure 12 is a partly diagrammatic sectional view of a part of the pin elevating member showing the manner in which pins are delivered from the pit of a bowling alley into the rotary pin elevating member;

Figure 13 is a partial sectional view showing a detail of the pin supporting flange of the rotary pin elevating member taken on line 13—13 of Figure 9;

Figure 14 is a view taken on line 14—14 of Figure 13;

Figure 15 is a sectional side elevation illustrating the pin gripper operating mechanism in position to effect the release of pins from pockets in the rotary pin elevating member;

Figure 16 is a front elevation of the mechanism for effecting the movement of the pin gripping rods into and out of operative pin gripping position and the pin counting device;

Figure 17 is a view of the pin counting mechanism taken on line 17—17 of Figure 16;

Figure 18 is a view taken on line 18—18 of Figure 16;

Figure 19 is a partial perspective front elevation of the pin elevating mechanism illustrating a modified pin seating and ejecting mechanism; and Figure 20 is a plan view of the mechanism shown in Figure 19.

Referring to the drawings which illustrate a preferred embodiment of the invention, bowling pins 10, falling from or removed from alley A of any desired conventional design by suitable means (not shown) into pit P after a bowler has rolled a ball, drop upon a conveyor or traveling apron designated generally 20. This conveyor, which preferably is continuously in motion, runs upon driving and driven pulleys 22, 24 respectively, mounted at the rear and front of pit P as shown in Figures 1 and 5. Pulleys 22, 24 extend transversely across pit P and support a pit-wide traveling carpet or apron 20. Pulley 22 is mounted on shaft 28 which at one end is provided with a sprocket 30 tracked by a sprocket chain 32 running on a sprocket (not shown) secured to a continuously driven shaft of the machine (not shown). Shafts 28 and 34 are so mounted that rollers 22, 24 are inclined downwardly from one side of the machine to the other side thereof. As indicated in Figure 1, shaft 34, which supports pulley 24, is mounted at a higher level than shaft 28 so that the upper lap 26 of conveyor 20, which carries bowling pins rearwardly in pit P beneath cushion or backstop 12, is inclined downwardly and rearwardly and to one side in pit P. A ball B dropping upon conveyor 20, because of this arrangement, rolls downwardly and to one corner of pit P and is conveyed beneath backstop 12 to the rear of pit P. As shown in Figure 5, a ball separator is provided for separating a ball B from pins 10 and also for directing the ball to one side of pit P for removal therefrom and placement upon a suitable return runway of conventional design (not shown) for return to a bowler. A suitable pin and ball separating and directing device consists of a yielding guide, such as a diagonally arranged transverse tensioned coil spring 33. One end of spring 33 is secured at 36 to kickback K1, and the other end attached to a post 38 secured to the floor of pit P adjacent the ball lift designated generally 44.

Referring to Figures 1 and 5, it will be seen that ball lift 44 selected for purposes of illustration, comprises a horizontal shaft 46 having its ends rotatably supported in suitable bearings in uprights 48 and 50, attached to the frame of the machine. Secured to and adjacent the ends of shaft 46 are sprockets 52 on which run endless chains 54 which in turn run on and are driven by sprockets 55 attached to the ends of a suitable continuously driven shaft 57 also mounted in uprights 48, 50. Secured to chains 54 at equally spaced intervals are semi-circular ball engaging and lifting supports 60 which are adapted to move upwardly beneath balls to be lifted and delivered thereby onto a suitable ball return runway 65, Figure 1. Each lifting support 60, to which a ball is delivered by conveyor 20, resembles a half-ring, having one end 61 extending outwardly from one chain a greater distance than its other end 63. See Figure 5. This design insures that as a ball is ejected from a support 60, the longer end 61 thereof will bear against the ball and give it a push along the return runway, thereby expediting its return to a player.

As illustrated in Figures 1, 5 and 12, the upper lap 26 of apron 20 carries all bowling pins 10 and balls B rearwardly in the pit, a ball B being separated from bowling pins 10 by separator 33. Bowling pins on conveyor 20 are also directed by two directing members or plows 62 and 64 located at opposite sides of conveyor 20 onto chute 68 on which they slide or gravitate into the pin elevating device, designated generally 70. The face of chute 68 is at approximately the same angle as the flange 122 of device 70, as seen in section in Figure 12, so that a pin can actually roll down over chute 68 and move or be moved into channel 114 over its inclined flange 122. It follows that pins are delivered to and picked up by rotary member 70 without the use of mechanical adjuncts, thus reducing the structure to the minimum of parts. Pins are subjected to very little wear and agitation, and their reception in the elevating mechanism is achieved quickly and with a minimum of noise.

Plow 62 is attached to upright 50 and to alley kickback K2. It extends outwardly from kickback K2 and acts to divert bowling pins away from kickback K2 and rings 60 of ball lift 44 for discharge by lap 26 of conveyor 20 down chute 68 into pin elevating device 70. Plow 64 is attached to a bracket 72 suitably secured to kickback K1. Plow 64 is formed with two active pin engaging surfaces 74 and 76. Surface 74 extends inwardly and downwardly from kickback K1 and directs bowling pins on lap 26 of conveyor 20 away from kickback K1 and onto chute 68. Surface 76 is curved upwardly from a point adjacent chute 68 and conforms generally with the curve of the outer periphery of pin elevating device 70. In this manner, any bowling pin not properly aligned or positioned either butt end or handle end foremost in device 70 with its longitudinal axis substantially parallel with the circumference of member 70 slides downwardly over surface 76 onto chute 68 or conveyor 20 or into the lowermost part of device 70 for repositioning for proper elevation.

A preferred embodiment of pin elevating device 70 comprises generally a rotary member 70, preferably of circular contour mounted to turn on a substantially horizontal axis being for this purpose supported on a horizontal shaft 82. Shaft 82 may be continuously driven by pulley 84, Figures 1 and 4, from a motor 86 supported on a suitable bracket 87 attached to the frame of the machine. Member 70 can be run at any desired speed suitable for handling pins 10 in accordance with the cyclic requirements of the bowling pin spotting machine (not shown) with which the invention is associated, as by a gear reduction 88, sprocket drive 90, shaft 92, pulley 94, and belt 96 running on and driving pulley 84, see Figures 1 and 4. The speed of rotation of device 70 is such that pins 10 are handled gently and not hurled or thrown about in annular channel 114 during the continuous rotation of device 70 while pins 10 are being lifted from the pin receiving station designated generally I, to the pin discharge station designated generally II, as indicated in Figures 1 and 4, where when released, they fall and/or roll by gravity out of pockets 132 in channel 114 as the rotation of member 70 travels each pocket 132 in succession to, through and away from Station II. As shown in Figures 1 and 4, pin discharge Station II is approximately above Station I. If desired, however, Station II may be located at some other position along the path of travel of pockets 132 as long as space is provided for the ejection of pins from pockets 132 into a receiving and aligning device for transfer to a pin spotter.

Shaft 82 is mounted in spaced bearings 98, 100. Bearing 98 is secured to a horizontal cross frame member 102 extending between and attached to the opposite inner faces of the kickbacks K1, K2. Bearing 100 is likewise secured to a similar cross member 104, Figure 6, forming part of a rear frame F having a lower cross bar 106 connected to bar 104 by diagonal struts 108.

The axis of the rotary pin elevating device 70 and of its shaft 82 is disposed midway between the inner faces of kickbacks K1 and K2, the periphery of the member 70 being of such diameter that it may rotate close to but in clearance with the kickbacks and adjacent the bottom of the pit P, shaft 82 being at a suitable elevation for this purpose.

As shown, particularly in Figures 7, 9, 11 and 12, rotary pin elevating device 70 is formed of sheet metal parts, or sections, although it may be made of light castings or otherwise produced to perform its desired functions. In the drawings, see Figures 4 and 7, the central or body portion 110 of member 70 is of substantially conical form having a circular marginal rim 112 which is attached to a marginal rim portion 118 forming a part of the inner flange or wall 116 of pin receiving channel or ring 114.

Secured at or adjacent rear bearing 100, is a circular plate 119 attached to and radiating from which are a number of generally triangular shaped brackets 120, see Figures 6 and 7. Brackets 120 are suitably secured, as by rivets, to conical body portion 110, thus providing the necessary stiffening to make a strong rigid structure of member 70.

Channel 114 also is formed with an outer marginal flange 122 substantially parallel to flange 116, the free edge of which is bent to provide a peripheral rounded bead or annular shoulder 124. Flanges 116 and 122 are joined by an integral wall formed of narrow straight walls 126, 128, 130 together forming the channel web. While these parts 126, 128 and 130 could be replaced by a continuous arcuate wall merging into the flanges or side walls 116 and 122, the flat parts, as shown, are desirable for facilitating the attachment thereto of spaced parts within the channel for operatively acting upon and supporting pins and effecting their travel in or with elevating member 70, as will be explained hereinafter.

As indicated in the drawings, annular pin channel 114 is so formed that it readily and easily receives pins lying lengthwise along and within channel 114, or with the axes of the pins lying in a plane generally transverse to the axis of rotation of device 70. Actually pins cannot be properly supported in member 70 for elevation in any other position. It will also be noted that the flanges 116 and 122 incline inwardly towards the axis of rotation of device 70 and forwardly with respect to the alley so that channel 114 faces in the direction from which the pins approach as they are urged rearwardly by apron 20.

It is customary in bowling that ten bowling pins 10 be placed on alley A in a predetermined generally triangular playing arrangement. The present machine is designed to insure that ten pins will always be delivered by the pin elevating device from Station I to Station II for transfer to a pin spotter (not shown). The invention, however, is designed to handle a number of pins in excess of ten; or seventeen pins in all. In the present instance, when ten pins are in playing arrangement on the alley, or some of these ten pins are in the pit P, seven pins may be seated in pockets 132. Obviously more than seventeen pins could be used, although if this were done, when ten pins were on the alley and seven pins where held in pockets 132, the remainder would lie in the pit or be loosely held in the lower portion of member 70 adjacent Station I. As indicated in Figures 4, 7 and 9, member 70 is divided into seven equal sections S, each having a pocket 132 provided in and along channel 114. Each pocket 132 is so designed that the belly portion of each pin as it is discharged from upper lap 26 of conveyor 20 for gravitational movement down chute 68 over lip 124, arrives in channel 114 of slowly rotating member 70, and sooner or later as the latter continues its travel, accommodates itself in one of the several pockets 132 provided therein. Although seven pockets have been found to operate satisfactorily, obviously if desired, more or less pockets could be provided. This depends to some extent upon the length of the circumference of the rotary pin elevating member 70, and the length of the bowling pins, depending upon whether tenpins or duckpins or other type of pin are being handled.

For convenience, the seven sections S are arbitrarily separated by radial dash dot lines L, as seen in Figure 4. As stated before, pins 10 can only be supported properly and operatively in channel 114 while lying lengthwise therealong. The groups of pin positioning and supporting elements in each section S accordingly are shaped and disposed to support pins in pockets 132 in rotary member 70, regardless of the direction of pins 10. Whether head first or butt first, the elements will orient the pins so that a control zone z of each pin between the neck and butt end is engaged in a manner such that, should pins 10 occupy pockets 132 in all seven sections S, the zones z of such pins are approximately equidistant regardless of head or butt first positions.

The groups of the positioning and supporting elements in each pocket 132 are the same in construction and operation. Therefore the description of one group will suffice for all. Secured to the inner faces of flanges 116 and 122 are abutments 134, each having two oppositely inclined faces 136. The position and inclination of faces 136 are such that when pins 10 are engaged thereby approximately about the zone z thereof, the abutments apply motive force to the pins, at least during their early travel up out of the pit, or until they are well settled in a pocket 132 for travel to Station II.

It is desirable to support pins 10 in each pocket 132 with their axes as nearly parallel to the circumference of member 70 as possible to thereby confine pins 10 properly in pockets 132 and reduce tilting and possible projection of pins out of the pockets in which they are located en route to Station II as member 70 rotates.

To this end, a block 138 is secured to the wall section 128 of channel 114. This block has an inclined guide face positioned to engage the butt end of a pin traveling head first to thereby guide the pin into pocket 132 and keep it from seating therein at an angle. Block 138 also will engage the neck of a pin travelling butt first, as shown at the left in Figure 4, for the same purpose.

It is readily apparent that in the operation of the pin elevating mechanism thus far described, a plurality of pins 10 can be present in the area adjacent the discharge end of apron 20, chute 68 and rotating pin elevating device 70. Due to the movement of rotary device 70 and to the action of conveyor 20 on pins 10, agitation of pins will occur, causing movement of some in different directions and rolling, or combined rolling and elevation of others as the pins attempt to seat themselves in channel 114 and more especially in pockets 132 under control of the pairs of abutments 134 and of the blocks 138. Pins entering endwise between sets of such elements also may be turned or moved towards or back upon lap 26 of conveyor 20, delaying their time of elevation until they are again delivered into channel 114. To reduce agitation and rolling of pins, and loss of time, there is arranged, as a part of each pocket 132, an elongated block or slab 140, which may be of wood or sheet metal. These slabs lie in the bottom of channel 114 with the main outer face of each lying somewhat below a plane passing through the angles between flange 116 and wall 126 and flange 122 and wall 130, respectively. The face of each block 140 is thus below the upper portion of an adjacent block 138. The trailing end 141 of each slab is tapered, Figures 13 and 14, to merge into the bottom of channel 114. By such means pins 10 lying in the path of slabs 140 are given a movement tending to cause them to straighten out into parallel relation with the flanges of channel 114 of rotary member 70, and if any pins are rolling, this action is reduced as such pins attempt to "climb." They are urged into position to roll or fall into an empty pocket 132 by sliding downwardly over and along the face of an upwardly moving slab 140. The time of orientation, pickup and elevation of pins is thereby speeded, and wear of pins is considerably reduced.

Figure 4 illustrates the manner in which bowling pins 10, positioned in pockets 132, either handle end or butt end forward in the direction of rotation of device 70, are elevated and conveyed to Station II for delivery to orienting and distributing mechanism, described hereinafter. In Figure 4, a bowling pin 10(1) is shown resting in a pocket 132 closely adjacent Station I with zone z of the pin in engagement with the inner faces of channel 114 and the neck portion thereof lying against tapered face 141 of slab 140. In this same pocket 132, the butt end of pin 10(1) engages the bottom edge of the inclined face of block 138. Bowling pin 10(1) referred to also has its butt end held in position against lateral shifting movement by inclined faces 136 of abutment members 134. In this same figure, a bowling pin designated 10(2) is positioned in a pocket 132 with the neck thereof in contact with surfaces 136 of laterally spaced pin positioning blocks 134 and with the tapered portion of the butt end of the pin resting on inclined face 141 of pocket forming slab 140.

After each pin is seated in a pocket 132 in member 70, about at Station I, as indicated in Figure 4, it remains in seated position therein under rotation of member 70 until approximately the next higher position, or the position occupied by pin 10(2) in Figure 4. Thereafter as pin elevating member 70 continues its upward rotation, gravity will tend to shift the pin out of seated position or cause it to fall out of its pocket 132. Therefore in order to prevent this from happening, means are provided to firmly hold each pin in seated arrangement in a pocket 132 as soon as it reaches the position occupied by pin 10(2), at least until it arrives above and opposite pin receiving and aligning device 142. In the embodiment selected for purposes of illustration, each pocket 132 is provided with a clamping device 149 including a radially movable clamping or gripping rod 150 which secures a pin therein against falling out of the pocket. Under certain operating conditions, the clamping or holding action may be continued even though a pin is carried beyond Station II and retained in its pocket 132, until selectively operated mechanism effects its release, as explained in detail hereinafter.

Since pin elevating device 70 is provided with seven equidistantly spaced pockets 132, seven pin clamping devices 149 are provided, one being provided for each pocket. The construction and operation of each device 149 and its operating mechanism are the same. Therefore in the interest of brevity, only one is described in detail.

Each device 149 includes a clamp rod 150—see Figures 6–8 and 10—at the rear of the member 70 disposed radially relative thereto, and if desired, on one of the lines L defining the sections of member 70, see Figure 4. The outer end of each rod 150 is slidably mounted in a clip 152 at the inner margin of channel 114 for movement into and out of a pocket 132. The free end of each rod 150 is preferably outwardly curved in order to slide freely through a bore in clip 152 in order to engage a pin 10 in zone z, as shown in Figure 7, and firmly hold it in a pocket 132. The inner end of each clamp rod 150 is swivelled in the free end of a lever 154 pivoted on a stud 156 suitably supported on a lug 158 projecting from bracket 120. A coil spring 160 surrounding rod 150 and bearing between its swivel block 162 and a collar 163 secured to rod 150, tends to force rod 150 outwardly to carry its free end into channel 114 and against a pin 10 seated in a pocket 132, in the manner shown in Fig. 7. This action clamps a pin in a pocket 132 in channel 114 and prevents its dislodgement therefrom. Secured to lever 154 by spacing blocks 178, 179, bolts 180 and studs 190 and nuts 182, is a plate 184. The free end of lever 154 and plate 184 are provided with bores 186 which form bearings for trunnions 161 on swivel block 162 and on which block 162 swings during the movement of lever 154 to and from broken and full lined positions shown in Figure 8. Mounted on a stud 190, carried by plate 184 and lever 154, is a cam follower 192 which runs on a stationary cam 194, Figure 6, attached to frame F.

The retraction of rod 150 is effected by a tension spring 164 having one end secured to spacing block 179, and its other end connected to stud 206 on plate 119. The result is to draw a foot 200 on the inner end of rod 150 into engagement with a stop 202 secured to a bracket 204 mounted on member 70, thus locating the outer end of rod 150 in pin releasing or unclamping position.

Cam 194 is secured to or forms part of plate 195 secured to the frame of the machine. The major part of cam 194 is concentric with the axis of rotation and has a leading portion 197 and a trailing portion 198 positioned to be engaged by cam followers 192, so that as the member 70 rotates, each roller 192 successively engages lead-on portion 193 of track portion 197 and rolls therealong in a manner to compress spring 160 against collar 163. In this way, the outer end of each clamp rod 150 is forced into a pocket 132 in channel 114. If a pin is seated therein, rod 150 will clamp it resiliently in place by virtue of compression of spring 160.

As shown in Figures 6 and 16, so long as a cam follower 192 of a clamping unit 149 is in engagement with cam track portion 197, gripping rod 150 of each unit 149 is located in operative position relative to a pocket 132, and if a pin is seated therein, rod 150 will hold it firmly and prevent it from dropping out of the pocket. When pins are being removed from pit P and elevated by pin elevating device 70 for delivery to pin receiving and aligning mechanism 142, it is necessary that as a pin reaches Station II, it be released from pocket 132 in which it is held by rod 150 for delivery to pin receiving and aligning mechanism 142.

In order to accomplish this, cam 194 is provided with an interrupted section or gap 210 located approximately beneath Station II, or as shown in Figure 6, separating cam track portions 197 and 198. When pins are released from pockets 132, each cam follower 192 is pulled by its respective spring 164 downwardly or radially inwardly to a position shown in Figure 6, whereupon each rod 150 moves inwardly and out of engagement with a pin in a pocket 132. Cam follower 192 is then on the inner face of cam track portion 198. Continued rotation of pin elevating device 70 results in cam follower 192 again engaging and tracking the lead-on portion 193.

Since at times during the operation of the machine, it is desired to retain pins in pockets 132 and not discharge them at Station II, there is provided a movable cam track section, or cam gate 212 having the same radius as cam track 197, which can be moved selectively into and out of gap 210. When cam gate 212 is located in the gap 210, it forms a continuation of cam track portions 197 and 198, and so long as it occupies this position, bowling pins will not be discharged from pockets 132 at Station II.

Referring to Figures 1 to 4 inclusive, it will be seen that pin receiving and aligning device 142 comprises a generally U-shaped pan 214, which is located beneath the channel 114 to provide a surface on which pins released from pockets 132 are received. On the posts 144 which support pan 214, and beneath pan 214, are mounted bearings 216 supporting a horizontal shaft 218 carrying a pulley or roller 220 about which one turn of an endless belt 148, entering between or adjacent legs 215 or pan 214, passes. Posts 144 which support pan 214 are vertically mounted on a frame cross member 146 which is secured to suitable brackets (not shown) attached to kickbacks K1 and K2. Belt 148 preferably is provided at its sides with guides 222, aiding pins 10 in traveling lengthwise away from device 142 upon the upper run of belt 148. Shaft 218 and pulley 220 are rotated by any suitable means, such as a motor 224, Figure 2, to move belt 148 in the direction indicated by arrow 226.

Occasionally upon release from a pocket 132, a pin may be delivered handle end first onto pan 214. In order to insure that a pin delivered with either the handle end or the butt end forward will move butt end forwardly on belt 148, there are provided pin abutments, such as posts 228, mounted on and projecting upwardly from each leg 215 of pan 214, so spaced and located with respect to pin elevating device 70 and its direction of rotation that when a pin moving out of a pocket 132 is not properly aligned or oriented by pan 214 alone, such pin will engage one of the posts 228 in a manner to insure that it will swing about the posts and be carried butt end first by conveyor 148 as described hereinafter.

In the operation of the machine, all pins elevated to discharge Station II with butt ends foremost, when released from pockets 132 will roll and fall out of pockets 132, as shown in Figure 2. The dynamics are such that due to the angle of flange 122 and that of the rear arcuate or curved sloping portion of pan 214, each rolling and falling pin will proceed angularly butt end first. The handles of pins moved to Station II butt end first, engage and swing about the lower post 228, as viewed in Figure 2. The handle portions of pins moved to Station II head first engage and swing about upper post 228, as viewed in Figure 2, in a manner to insure the movement of such pins butt first onto conveyor 148 and such pins always straighten out to travel in that manner.

If all pockets 132 of the member 70 are filled with pins, when discharged therefrom, they will be carried on the belt 148 butt end first and substantially equally spaced therealong. If a pin is absent from a pocket in channel 114, the pin following will be delivered on the belt and carried at twice the distance of the other pins. The point of discharge of all pins is the same in each case, the parts of the mechanism being arranged to always allow the zone z of each pin to roll to the same relative position.

As described hereinabove, the continuous rotation of pin elevating mechanism 70 results in the movement of a succession of pins to Station II, where they are delivered to pin receiving and aligning or orienting device 142. When ten pins 10, or a set of pins, has been delivered to device 142 and the requirements of the play of the game have been met, the delivery of additional pins to device 142 is stopped until such time as it is desirable for it to be resumed. When this is done, excess pins are retained in pockets 132 where they remain in storage in elevating member 70 until needed. The retention of pins in member 70 and their discharge therefrom are effected selectively by cam section or gate 212 described hereinabove.

Movable cam section or cam gate 212 is pivoted at 240 on the stationary plate 195 to swing from an operative position in gap 210 where it constitutes a continuation of cam track portions 197, 198, to an inoperative position out of gap 210, as indicated in Figure 15. The movement of gate 212 is effected selectively by solenoid 242 having an armature 244 connected to cam gate 212 by pivoted link 246, Figure 15. Solenoid 242 is mounted on a bracket 247 suitably secured to plate 195.

In order to effect the selective delivery of ten pins or a set of pins to pin receiving and aligning or orienting device 142, mechanism is provided for counting the number of pins delivered thereto. This comprises a counting mechanism designated generally 245 which is actuated by operating members or rings 248 attached to rods 150. As shown in Figures 5, 7, and 15 to 18 inclusive, suitable locking rings 250 on opposite sides of each ring 248 and attached to rod 150, secure ring 248 in a fixed operating position. Rings 248 are so positioned on rods 150 that during the rotation of pin elevating device 70, whenever a pin is held in a pocket 132 by a rod 150, the counting mechanism is actuated as described hereinafter. When ten pins have been counted, further delivery of pins to device 214 is stopped.

Counting mechanism 245 includes a counter wheel 252 having ten equally spaced teeth 254. Counter wheel 252 is rotatably mounted on a stud 253 secured in the upper end of a swinging plate 258 pivoted at 260 on an arm 261 extending from plate 195. When cam gate 212 is located in inoperative position (see Figure 15), roller 262 mounted on rod 264 extending from the lower web of swinging plate 258, bears on cam gate 212 and holds plate 258, as shown in Figure 17, in a position wherein the teeth 254 of counter wheel 252 can be engaged by ring 248 on each clamp rod 150 when each rod 150 is actually holding a pin in a pocket 132. On the other hand, if no pin is in a pocket 132 and a rod 150 projects into a pocket 132 beyond clamping position, as shown in broken lines on Figures 16 and 17, such ring 248 is then out of line with and cannot engage a tooth 254 and shift wheel 252 one space. Under this condition, no count is made.

The step by step rotation of ten tooth counter wheel 252 as the result of the delivery of pins at Station II to pin receiving and aligning or orienting mechanism 142, eventually brings a pin 266 on counter wheel 252 into position to stop further discharge of pins from pockets 132. As seen in Figures 16 and 18, pin 266 is secured to the underside of counter wheel 252 adjacent the tenth tooth 254. When ten pins have been discharged at Station II from pockets 132, pin 266 operates a control mechanism which moves cam gate 212 into operative position and stops the feed of pins to mechanism 142. Pin 266 is adapted to move into engagement with and flex a spring 268 which actuates a suitable normally closed switch 270 in a circuit including the coil of solenoid 242 and lines 272, 274, 274a and 275 connected to a source of power. Switch 270 is mounted on a bracket 271 secured to plate 258.

So long as switch 270 remains closed, solenoid 242 is energized and holds cam gate 212 in open or inoperative position. When the circuit is broken by pin 266 in the manner described, solenoid 242 is de-energized and cam gate 212 is moved by spring 243 and by roller 262 on plate 258 into closed or operative position between cam track portions 197 and 198. At this time, counter wheel 252 is swung by spring 276 to inoperative position as indicated in broken lines in Figure 17. When pins are again to be fed to receiving and aligning mechanism 142, a control is actuated to effect their release from pockets 132 in which they are held. As the result of actuating this control, counter wheel 252 is moved into operative position and cam gate 212 is moved to its inoperative position away from stop 211. When this is done, as each cam follower 192 runs off cam track portion 197, each pin held by a rod 150 is released and falls and rolls from its pocket into mechanism 142. The control device includes a switch 278 which can be closed manually or by a movable part 280 of the pin spotting machine (not shown). The closing of switch 278 makes a circuit through lines 277, 274a, coil 242 and line 275. Switch 278 is maintained closed a period of time sufficient to allow pin 266 to be moved out of engagement with spring 268, after which the operation of the counting mechanism and delivery of pins from pockets 132 continue until ten pins have been discharged from pockets 132 and switch 270 is opened again.

In the normal operation of pin elevating device 70, pins usually will be seated properly in pockets 132 with all portions of each pin lying within the extremities of the flange edges of the channel 114. In this condition the machine will perform as has been explained, either for counting and delivering a selected number of pins or for storing pins to the full capacity of member 70. Occasionally, however, a pin may be improperly seated in a pocket 132 for one reason or another. Some such pins will project out of the channel more or less after elevation thereof has commenced. In order to avoid such conditions, means are provided for engaging and seating such pins if not projecting out too far. A device is also provided for ejecting pins that cannot be biased into proper seated position. The means for effecting the first-named result comprises a yielding member, such as a curved leaf spring positioning member 282, Figure 4, which is mounted on an arm 284 pivotally mounted at 286 on frame member 288. A spring 290, having one end attached to arm 284 and its other end secured to a stud 291, urges spring positioning member 282 inwardly against pins, as shown. Stud 291 is held by and projects from the inner wall of kickback K1. A stop pin 293, also projecting from said inner wall of kickback K1, is provided to check the inward movement of arm 284. If a pin in a pocket 132 has its head projecting outwardly so that the end thereof rests against the outside of marginal bead 124, such pin does not offer too much resistance, and spring 282 will force the pin into position. However, if the resistance is too great, and the pin is lodged, the head of such pin in ascent will ride against and up along the inner face of a flat spring or band 292 mounted in its path on kickback K1 which deflects the pin until it over-balances as it gradually leaves spring 282 and pressure thereby on the pin is reduced. This pin then falls by gravity out of pocket 132 and drops back into pit P and at a later time is again seated in another pocket 132 of member 70.

A modified form of mechanism for insuring the proper seating or positioning of bowling pins in pockets or units 132 in member 70 is shown in Figures 19 and 20. This mechanism includes a pin engaging and pressing member, such as a roll or wheel 300, having a generally hourglass shape, rotatably mounted at the free end of a rod 302 so as to locate the periphery of wheel 300 adjacent the path of movement of bowling pins in pockets 132. If a bowling pin is improperly positioned in a pocket 132, that is, if it is not seated therein with all portions of the pin within channel 114, wheel 300 is operative to engage either the handle or butt end of such pin as it is moved by member 70 into and past the range of operation of wheel 300. This results in the application of resilient pressure by wheel 300 on the bowling pin thus engaged whereupon the pin is turned about its belly portion or about zone $z$, and becomes properly seated in pocket 132, where it remains thus positioned until it is discharged from its pocket at Station II.

Rod 302 is secured to a hub 304 of a suitable T-shaped bracket 306 pivoted on a stud 308 mounted in a forked bracket 310 attached to plate 312 of supporting member 314 which is suitably attached to the inner wall of kickback K1. Wheel or roll 300 is maintained in its operative position for resilient engagement with improperly positioned bowling pins by a tension spring 316, one end of which is fixed to a post 318 on kickback K1, the other end being suitably secured to rod 302. The inward movement of wheel 300 with respect to pockets 132 is controlled by means of a stop screw 320 adjustably mounted in a bar 322 secured to bearing bracket 310.

Stop screw 320 limits the inward movement of wheel 300 by virtue of the fact that such movement is prevented when stop screw 320 is engaged by hub 304 on T-shaped member 306. The adjustment of stop screw 320 also permits an effective use of positioning or seating wheel 300 with pins of different diameters. Therefore regardless of the use of new or old pins in the machine, each type will be positively and properly seated or positioned in pockets 132 for delivery to Station II.

Figures 19 and 20 also illustrate a modified form of pin ejecting mechanism which may be provided for the purpose of ejecting pins which if they remained in pockets 132, probably could not be satisfactorily positioned or seated therein by wheel 300. This embodiment of the invention includes an elongated pin engaging member such as a roller 325. In the form illustrated, roller 325 consists of a plurality of side by side rollers 326, preferably ball bearing rollers, loosely rotatably mounted on a rod 328 projecting from an arm 330 secured to a shaft 332 loosely supported in spaced bearings of bracket 334 secured to the inner wall of kickback K1. A coiled tension spring 336 having one end attached to a collar 338 fixed to shaft 332 and its other end engaging bracket 334, is provided for the purpose of urging roller 325 downwardly and to permit yielding of rod 328 and arm 330 so that when any of the rollers 326, which make up roller 325, is engaged by a misaligned pin of which the handle or butt end projects too far out of a pocket 132, the pin will be removed from pocket 132 and drop back into Station I and at the same time no sudden jolt or breakage can occur when such pin is ejected from a pocket of pin elevating member 70. The operation of this mechanism is such that whenever a bowling pin is improperly seated or positioned in a pocket 132 of member 70 and the handle or butt end thereof engages the outside surface of roller 325, such pin will be pushed out of or ejected from its respective pocket 132, whereupon it falls back into Station I or onto lap 26 of conveyor 20. On the other hand, if the handle end of an improperly positioned pin in a pocket 132 engages the inner face of roller 325, it will be turned or swung partly into proper seated relationship in its pocket. As the pin travels upwardly, it will be engaged by wheel 300 and located thereby in proper seated arrangement in member 70.

The invention above described may be varied in construction within the scope of the claims, for the particular embodiments selected to illustrate the invention are but a few of the possible concrete forms which our invention may assume. The invention, therefore, is not to be restricted to the precise details of the structures shown and described.

What we claim is:

1. In an automatic bowling pin setting machine for use with a bowling alley having a pit at one end thereof, mechanism for elevating pins from a pin receiving station in said pit to a pin delivery station comprising a rotary member mounted to rotate about a substantially horizontal axis, means for rotating said member, said member having a circumferential pin receiving channel of generally U-shaped cross section with the side walls thereof extending inwardly towards said axis of rotation and disposed concentrically about said axis of rotation and the cross section dimensions of which enable pins to lie between said side walls with their longitudinal axes transverse to said axis of rotation of said member, means for delivering pins from said pit into said channel, spaced abutments in said channel against each of which a pin may seat in spaced relation to other pins in said channel, means for holding pins in said channel on said abutments to prevent their removal from said channel during at least a portion of the rotation of said member from said receiving station to said delivery station, and means operative at said delivery station for releasing pins for discharge from said channel.

2. A pin elevating device for a bowling pin setting machine associated with a bowling alley having a pit at one end thereof, comprising a rotary member having an internal continuous arcuate pin receiving channel substantially U-shaped in cross section with the side walls thereof extending inwardly and substantially at right angles to the axis of rotation of said member for carrying pins with their longitudinal axes substantially at right angles to said axis of rotation of said member, means for delivering pins from said pit into said channel as said member rotates, pin receiving and conveying means spaced from said pin delivery means and adjacent said pin receiving channel, means on said rotary member for releasably holding pins against removal from said channel in spaced, end to end relation during their movement therewith from said pin delivery means towards said pin receiving and conveying means, and means operable to release said pins from said channel as they reach said receiving and conveying means.

3. In a bowling pin spotting machine for use with a bowling alley having a pit at one end thereof, mechanism for elevating pins from said pit comprising a rotatable annular channel having a generally U-shaped cross section with the flanges thereof directed inwardly towards the axis of rotation of said channel and substantially at right angles thereto, means mounting said channel in said pit for rotation about a substantially horizontal axis and to enable successive portions thereof to pass into and out of said pit, means for rotating said channel, means for moving pins from said pit into said channel as successive portions pass therethrough, whereby said pins are received in said channel and lie with their longitudinal axes substantially at right angles to said axis of rotation, and means on said channel for holding said pins in said channel against removal therefrom during the rotation of said channel and their elevation thereby from said pit.

4. In a bowling pin setting machine for use with a bowling alley having a pit at one end thereof, mechanism for elevating bowling pins from said pit comprising a rotary member operative in said pit, said member having a circumferential rim portion and spaced side walls extending inwardly therefrom substantially at right angles to the axis of rotation of said member and forming a generally U-shaped pin receiving and elevating channel including a plurality of substantially equidistantly spaced pin receiving and supporting units mounted in said channel, means seating a pin in each of said units, means movable with said member for securing said seated pins in said units for travel with said member, a discharge station, and selectively actuated means operative at said discharge station for releasing said pins from said units.

5. The machine defined in claim 4 including a pin receiving and aligning mechanism located at said discharge station, and means in said last-named mechanism for aligning pins received therein with their butt ends extending in one direction.

6. In a bowling pin setting machine for use with a bowling alley having a pit at one end thereof, mechanism for elevating bowling pins from said pit comprising a rotary member having a pin receiving channel extending about its axis of rotation so that parts thereof may successively pass through said pit and then through a pin discharge station remote from said pit, means for directing pins into said channel at said pit, mechanism for releaseably securing pins against substantial movement in said channel during their passage from said pit to said discharge station, said last named mechanism including a plurality of pin holding rods, means mounting each of said rods for movement into engagement with a pin to be held in said channel, and means for moving each of said rods out of engagement with a pin at said station to release said pins in succession from said channel as they enter said discharge station, whereby each released pin may automatically roll out of said channel at said station.

7. In a bowling pin setting machine for use with a bowling alley having a pit at one end thereof, mechanism for elevating bowling pins from said pit comprising a rotary pin elevating member, spaced pockets in said member, a pin discharge station, means for directing pins into said pockets, a plurality of pin holding elements movable with said rotary member, means for moving a holding element into holding engagement with a pin in a pocket during passage of pins from said pit to said discharge station, and means for moving said holding elements out of engagement with pins in said pockets to release said pins from said pockets at said discharge station.

8. In a bowling pin setting machine for use with a bowling alley having a pit at one end thereof, mechanism for elevating bowling pins from said pit comprising a rotary member having an annular channel extending about its axis of rotation, a plurality of substantially equidistantly spaced pin holding units in said channel, a pin receiving station, a pin discharge station, means for rotating said member to travel said units in succession to and from said pin receiving station and to and from said pin discharge station, means for directing pins at said receiving station into said units in said channel, a plurality of pin holding elements movable with said rotary member, means coacting with said holding elements to move said elements in succession into said units to hold pins seated therein during the movement of said pins in said units from said receiving station to said discharge station, and means coacting with each of said holding elements at said discharge station for moving said holding elements out of engagement with said pins in said units to release said pins at said discharge station.

9. In an automatic bowling pin setting machine for use with a bowling alley having a pit at one end thereof, a pin discharge station, mechanism for elevating bowling pins from said pit comprising a rotary member having a pin receiving channel extending about its axis of rotation so that parts thereof may successively pass through said pit and then through said pin discharge station remote from said pit, means for urging pins into said channel at said pit, a plurality of pin holding elements movable with said rotary member, actuating mechanism for said elements, said last-named mechanism comprising a cam having a main cam track, means associated with said elements and coacting with said cam to move said elements in succession into holding engagement with pins in said channel during passage of pins from said pit to said discharge station, said cam including a movable track section having a radius substantially equal to the radius of said main cam track, and selectively actuated operating mechanism for locating said movable cam track section in one position where said section forms a continuation of said main cam track for maintaining said elements in engagement with pins in said channel, and for moving said cam track section out of said position, and means operative when said cam track section is located out of said position for effecting the release of pins by said elements.

10. In a bowling pin setting machine for use with a bowling alley having a pit at one end thereof, a pin receiving and aligning device, a pin receiving station, mechanism for removing bowling pins from said pit comprising a rotary member having a pin receiving channel extending about its axis of rotation, means mounting said member for rotation such that parts of said channel may successively pass to and through said receiving station and deliver pins to said device remote from said receiving station, means in said pit for urging pins into said channel at said receiving station, a plurality of pin holding means, means for effecting engagement of said holding means with pins during their movement in said channel from said receiving station to said device, and movable means operable, in one position, to hold said holding means in engagement with pins in said channel during the passage of said pins through and beyond said device, said movable means, when shifted to another position operable to move said holding means to a position to effect release of pins from said rotary member for delivery to said device.

11. The machine defined in claim 9 including a pin seating device, comprising a pin engaging wheel, a support mounting said wheel to project into the path of travel of pins improperly located in said channel and means biasing said wheel into resilient engagement with said improperly positioned pins whereby due to the relative movement of said pins and wheel, improperly positioned pins are moved into proper seated positions in said channel.

12. In a bowling pin setting machine for use with a bowling alley having a pit at one end thereof, mechanism for elevating bowling pins from said pit comprising a rotary member, a plurality of substantially equidistantly spaced holding units on said member, means for delivering pins into said units, movable pin holding members mounted on said rotary member and spaced in accordance with the spacing of said units on said member, each holding member having a part which, in one position thereof, is free of engagement with a pin and which, in another position of said member, is engageable with a pin located in a unit to hold the said pin in said unit, operating means for said members, a cam engageable by said means to move said members into holding contact with pins in said units, said cam having an operating part maintaining said holding members in pin engaging position during only a selected part of a revolution of said rotary member.

13. The machine defined in claim 12 including a pin guide having a pin guiding surface located at each side of said pit for guiding pins to said delivering means, and means in said pit for directing pins past said guides and along said surfaces to said delivering means.

14. In a bowling pin setting machine for use with a bowling alley having a pit at one end thereof, mechanism for elevating bowling pins from said pit comprising a rotary member having a pin receiving channel extending about its axis of rotation in which pins may lie with their axes crosswise of said axis of rotation of said member, means for rotating said member, means for delivering pins from said pit into said pin receiving channel, devices for holding said pins against substantial movement in said channel for movement out of said pit by said member, and means for moving said devices in succession into engagement with said pins to hold said pins against substantial movement during the rotation of said member as it travels pins upwardly out of said pit.

15. The machine defined in claim 14, including a pin discharge station adjacent the path of travel of pins carried by said member, and means for successively moving said devices out of engagement with pins in said channel as each pin reaches said station.

16. The machine defined in claim 14 including a pin discharge station adjacent the path of travel of said member, and mechanism for selectively operating said devices to effect the release of pins from said channel as said pins carried by said member arrive at said station, and selectively operated means for incapacitating said mechanism to retain said pins in said channel during continued rotation of said member.

17. The machine defined in claim 14 including a pin discharge station adjacent the path of travel of said member, and selectively actuated control mechanism operating said devices for effecting the discharge of a predetermined number of pins from said member at said station.

18. In an automatic bowling pin setting machine for use with a bowling alley having a pit at an end thereof, mechanism for elevating bowling pins from said pit comprising a rotary member having a generally U-shaped pin receiving channel extending about its axis of rotation, means for rotating said member to travel successive parts thereof to and from a pin receiving station and then to and from a pin discharge station remote from said receiving station, means for directing pins into said channel at said receiving station, spaced movable clamping rods mounted on said rotary member, mechanism for actuating said rods, said mechanism including a stationary cam mounted concentric with the axis of rotation of said rotary member, said clamping rods each having a yielding mount operable to hold said clamping rods in inoperative position and having rollers thereon which are carried by the rotation of said rotary member into engagement with said cam to successively force said rods into engagement with pins in said channel against the action of said yielding mounts during only a portion of the rotation of said rotary member, said cam being so positioned as to move said clamping rods into clamping engagement with said pins as said rotary member moves with a pin in said channel away from said first-named station.

19. In an automatic bowling pin setting machine for use with a bowling alley having a pit at an end thereof into which pins, in addition to the number of pins set at one time on said alley, may be deposited, mechanism for elevating bowling pins from said pit comprising a member rotatable about a substantially horizontal axis so that successive parts of said member pass through said pit to receive pins therefrom, mechanism remote from said pit and adjacent said rotary member for transporting pins therefrom, means for holding bowling pins in said rotary member during at least a part of a rotation of said member and operable to release pins therefrom to said pin transport mechanism, pin counting mechanism operable by the rotation of said rotary member for automatically counting a desired number of pins as they are discharged therefrom for delivery to said pin transport mechanism, means operative in response to the delivery of said desired number of pins to said transport mechanism for rendering said counting mechanism ineffective, and means operative in response to the discharge of a desired number of pins from said rotatable member and the rendering of said counting mechanism ineffective to retain said pin holding means in engagement with subsequent pins delivered to said rotary member for retention therein for passage beyond said pin transport mechanism, whereby excess pins in said pit may be received by and held in said rotary member after the discharge of a counted number of pins for subsequent discharge from said member.

20. In an automatic bowling pin setting machine for use with a bowling alley having a pit at an end thereof, mechanism for elevating bowling pins from said pit comprising a rotary member, means for driving said member, said member having a pin receiving channel extending about its axis of rotation, means for delivering pins from said pit to said channel as said member rotates, groups of elements equally spaced throughout said channel for supporting and spacing pins from each other to lie with their axes crosswise of the axis of rotation of said member, a pin conveyor for carrying elevated pins from said rotary member disposed adjacent said pin receiving channel, a plurality of movable pin holding devices mounted on said rotary member and corresponding in number to the number of groups of elements in said channel, a cam track relatively to which said member rotates and including a stationary section, and a movable section disposed opposite said conveyor, said movable cam section being shiftable from a position out of alignment to a position in alignment with said stationary cam section to form a continuation thereof and said pin holding devices being mounted to successively engage and ride first over said stationary cam section and then over said movable cam section, being held by both said sections in position to hold pins against said groups of elements in said channel, to retain said pins in said channel for passage therewith past said conveyor without discharge, said pins thereby remaining stored in said rotary member, said holding devices being adapted to move to pin releasing position beyond said stationary cam section in response to the positioning of said movable cam section out of alignment with said stationary cam section.

21. In an automatic bowling pin setting machine for use with a bowling alley having a pit at an end thereof, mechanism for elevating bowling pins from said pit comprising a rotary member, means for driving said member, said member having a pin receiving channel extending about its axis of rotation, means for delivering pins from said pit to said channel as said member rotates, groups of elements equally spaced throughout said channel for supporting and spacing pins from each other to lie with their axes crosswise of the axis of rotation of said member, a pin conveyor for carrying elevated pins from said rotary member disposed adjacent said pin receiving channel, a plurality of movable pin holding devices mounted on said rotary member and corresponding in number to the number of groups of elements in said channel, a cam track relatively to which said member rotates and including a stationary section, and a movable section which may be shifted from a position in alignment with said stationary cam section to a position out of alignment with said stationary cam section, means for moving said movable section, each of said pin holding devices being engageable with and riding over said stationary cam section and means operative in response to the positioning of said movable section out of alignment with said stationary section and the movement of said devices off said stationary section for actuating said devices to successively release pins held thereby to said pin conveyor.

22. In an automatic bowling pin setting machine for use with a bowling alley having a pit at an end thereof, mechanism for elevating bowling pins from said pit comprising a rotary member, means for driving said member, said member having a pin receiving channel extending about its axis of rotation, means for delivering pins from said pit to said channel as said member rotates, pin supporting pockets equally spaced throughout said channel for supporting and spacing pins from each other to lie with their axes crosswise of the axis of rotation of said member, a pin conveyor for carrying elevated pins from said rotary member disposed adjacent said pin receiving channel, a plurality of movable pin clamping devices mounted on said rotary member and corresponding in number to the number of pin supporting pockets in said channel, a cam track relatively to which said member rotates and including a first stationary section, a second stationary section spaced from said first section and in alignment therewith, and a movable section disposed between said stationary sections and shiftable from a pin discharge position out of alignment with said first and second sections to a position in alignment with both to form a continuous cam track, said pin clamping devices being mounted to successively engage and ride over said first stationary cam section, then over said movable cam section when in said position of alignment and continuing over said second stationary cam section, said pin clamping devices being urged by said cam sections when aligned to clamp pins in said pockets in said channel to retain clamped pins in said channel during passage thereof past said pin conveyor without discharge, said pins thereby remaining stored in said rotary member, means operative in response to the movement of said devices beyond said first stationary section when said movable section is positioned out of alignment with said first and second stationary sections for releasing said devices from clamping engagement with pins in said pockets, and selectively operated means for moving said movable section into or out of alignment with said stationary sections.

23. In an automatic bowling pin setting machine for use with a bowling alley having a pit at an end thereof, and with which machine pins in excess of the number required for play are employed, mechanism for elevating bowling pins from said pit comprising a rotary member, means for continuously rotating said member about its axis, said member having an annular series of equidistantly spaced pin supporting units positioned to successively pass into and out of said pit and each unit to support one pin, means for urging pins from said pit into said units, a pin conveyor, pin holding devices for securing pins in said units, mechanism for effecting holding action by said devices during at least a part of a revolution of said rotary member, means for releasing pins for discharge from said units and counting mechanism operable by movement relative thereto of those holding devices having pins held thereby to count pins discharged from said rotary member until the required number for play has been delivered to said pin conveyor, and means then operable by said counting mechanism to incapacitate said releasing means to effect the retention of additional pins in said rotary member.

24. In an automatic bowling pin setting machine for use with a bowling alley having a pit at an end thereof, and with which machine pins in excess of the number required for play are employed, mechanism for elevating bowling pins from said pit comprising a rotary member, means for continuously rotating said member about its axis, said member having an annular series of equidistantly spaced pin supporting units, each to support one pin, said units being positioned to successively pass into and out of said pit, means for urging pins from said pit into said units, pin clamping devices rotating with said rotary member and corresponding in number to the number of pin supporting units therein, means for effecting clamping action of said devices on pins in said units during at least a part of each revolution of said member and for successively releasing pins therefrom after completion of such part of each revolution until the desired number of pins for play has been so released, means coacting with said clamping devices for operating said devices to automatically effect continued further clamping action by said devices on pins to prevent release thereof by said devices from said member during succeeding revolutions of said rotary member until said excess pins are all positioned in supporting units and all of said units are full, whereby excess pins are carried in storage in said rotary member, and means selectively operable for incapacitating said last-named means to effect the release of pins from said devices and their discharge from said units.

25. The mechanism defined in claim 7 including a pin seating device, a support mounting said device for engagement with a pin projecting out of said rotary member during the movement of said pin in said member upwardly from said pit whereby said pin is seated in said rotary member.

26. The mechanism defined in claim 7 including a pin seating device, a support mounting said device for engagement with an improperly positioned pin projecting handle end or butt end out of said rotary member as said pin is moved by said member upwardly out of said pit, whereby said pin is engaged and seated in said rotary member, a pin ejector, and means mounting said ejector along the path of movement of said rotary member for ejecting an improperly seated pin from said channel.

27. In a bowling pin spotting machine for use with a bowling alley having a pit at one end thereof, mechanism for elevating pins from said pit comprising a rotary member having a substantially horizontal axis of rotation, comprising an annular pin receiving channel, said channel being of a depth capable of seating and supporting bowling pins therein and having a generally U-shaped cross section with the flanges of said channel extending generally inwardly towards the axis of rotation thereof, means for moving successive portions of said channel into and out of said pit to receive pins therefrom, means for delivering pins from said pit into said channel, and means located at spaced points along and within said channel for receiving and holding pins for movement therewith against removal therefrom, whereby pins seated and held at spaced points within said channel may be elevated by said rotary member from said pit for discharge from said channel at a point above its axis of rotation.

28. In an automatic bowling pin setting machine for use with a bowling alley having a pit at one end thereof, mechanism for elevating bowling pins from said pit comprising a rotary member, means for continuously rotating said member about its axis, said member having an annular series of substantially equidistantly spaced pin supporting units positioned to pass successively into and out of said pit, each of said units being constructed to support one pin therein with the longitudinal axis of said pin extending in the direction of movement of said member, means for directing pins from said pit into said units, a pin conveyor, pin clamping devices mounted on said rotary member for movement therewith for securing and holding said pins substantially immovable in said units, means for effecting clamping action of said devices during at least a part of each revolution of said rotary member, and means for moving said devices out of engagement with said pins as each pin supporting unit reaches a point of discharge relative to said conveyor.

29. In a bowling pin setting machine for use with a bowling alley having a pit at one end thereof, mechanism for elevating bowling pins from said pit comprising a continuous arcuate rotatable pin receiving channel generally U-shaped in cross section with the side walls thereof extending radially relative to the axis of rotation of said channel, said channel providing a support in which pins may lie between said side walls with their longitudinal axes crosswise of the axis of rotation of said channel, means for rotating said channel, means for delivering pins from said pit into said channel, and means on said channel for holding said pins in seated arrangement therein against removal from said channel during at least a part of the rotation of said channel.

30. In a bowling pin setting machine for use with a bowling alley having a pit at one end thereof, mechanism for elevating pins from said pit comprising a rotary channel member having a circumferential bottom section and spaced side flanges extended outwardly therefrom towards the center of rotation of said channel, said side flanges being spaced apart a distance sufficient to receive and seat bowling pins with their longitudinal axes extending substantially at right angles to the axis of rotation of said channel, means mounting said channel in said pit so that parts thereof may successively pass through said pit and then through a pin discharge station remote from said pit, conveying means in said pit for directing pins and a ball rearwardly in said pit, a ball separator in said pit, means mounting said ball separator at a point spaced longitudinally from said elevating mechanism, means for directing pins separated from said ball to the bottom section and between said side flanges, means for holding said pins on said channel against removal therefrom during the movement of said pins by said channel to said discharge station and operative in response to the rotation of said member and the movement of pins therewith to said discharge station for discharging said pins from said channel, and means for rotating said member to elevate pins held in said channel to said discharge station.

31. The machine defined in claim 29 including means in said pit for guiding pins to said delivery means, means in said pit for directing pins past said guiding means to said delivery means, a device in said pit longitudinally spaced from said rotatable channel for separating a ball from said pins, a ball lift and means for operating said ball lift to remove said ball from said pit for return to a player.

32. In a bowling pin spotting machine for use with a bowling alley having a pit at one end thereof, mechanism for elevating bowling pins from said pit to a discharge station comprising a rotary channel member mounted for rotation in said pit, said channel member having a circumferential rim portion and spaced flanges mounted thereon and extending radially inwardly from said rim portion towards the axis of rotation of said member, said flanges being spaced apart a distance sufficient to allow bowling pins to be seated on said rim portion between said flanges with their longitudinal axes positioned substantially at right angles to the axis of rotation of said member, means for rotating said member, means for delivering pins in said pit into seated arrangement in said channel, means for holding pins against removal from said channel during their movement therewith to said pin discharge station and for discharging said pins at said station in response to the rotation of said member and their movement therewith to said station, and a pin receiving device located at said discharge station, said device having a portion located within said channel and beneath the rim portion thereof a distance such that pins discharged from said channel at said discharge station may fall into said device for delivery therefrom.

33. In an automatic bowling pin setting machine for use with a bowling alley having a pit at an end thereof into which pins, in addition to the number of pins set at one time on said alley, may be deposited, mechanism for elevating bowling pins from said pit comprising a member rotatable about a substantially horizontal axis so that successive parts of said member pass through said pit to receive pins therefrom, mechanism remote from said pit and adjacent said rotary member for transporting pins therefrom, means movable with said member for holding bowling pins in said rotary member during at least a part of a rotation of said member and normally operable to release pins therefrom to said pin transport mechanism, means for counting a desired number of pins discharged therefrom to said pin transport mechanism, and means operative in response to the counting and delivery of the desired number of pins to said transport mechanism for incapacitating said normally operable releasing means to maintain said pin holding means in pin holding engagement with pins seated in said rotary member.

34. In an automatic bowling pin setting machine for use with a bowling alley having a pit at an end thereof, mechanism for elevating bowling pins from said pit comprising a rotary member, means for rotating said member, said member having an annular pin receiving channel having spaced flanges lying substantially at right angles to its axis of rotation, said channel having a plurality of pin seats spaced along its length, each seat supporting one pin, means for delivering pins from said pit into said channel whereby they may enter said pin seats and be restrained from lateral movement as said member rotates, pin holding means movable for holding pins in said seats during rotation of said member and for releasing pins therefrom as each pin reaches a selected position for discharge from said member, pin counting mechanism, means operative in response to the delivery of pins in said channel at said selected position for operating said counting mechanism, and means operative in response to the counting and discharge of a predetermined number of pins at said selected position for discontinuing the discharge of pins from said rotary member.

35. In an automatic bowling pin spotting machine, mechanism for elevating bowling pins from the pit of a bowling alley to a point of discharge therefor, comprising a rotary member comprising a peripheral, annular channel having a generally U-shaped cross section, and with the legs of said channel directed inwardly towards the axis of rotation of said member, a plurality of substantially equidistantly spaced pin holding units in said channel for receiving bowling pins for movement with said member with the longitudinal axes of said pins positioned substantially at right angles with the axis of rotation of said member, means for rotating said member, means for delivering pins from said pit into said channel, means for holding said pins on said channel against removal therefrom during the movement of pins by said channel to said point of discharge and operative in response to the rotation of said member and the movement of pins therewith to said point of discharge for discharging said pins from said channel, a pin receiving conveyor located at said point of discharge, and means mounting said conveyor with a portion thereof located beneath said pin supporting units for receiving pins discharged from said units at said point of discharge into said conveyor.

36. In a bowling pin spotting machine, mechanism for elevating bowling pins from the pit of a bowling alley, comprising a rotary travelling member comprising an annular channel, said channel having a circumferential pin supporting bottom section and spaced side flanges extending inwardly from said bottom section at right angles to the axis of rotation of said member for holding pins on said bottom section with their longitudinal axes arranged substantially at right angles to the axis of rotation of said member, a pin receiving station, a pin discharge station, means for rotating said member, means at said receiving station for delivering pins into said channel, means for holding said pins against removal from said channel during their travel to said discharge station, and means operative in response to the arrival of each pin at said discharge station for discharging a pin from said channel.

37. The machine defined in claim 36 including a pin seating device, a support mounting said device for engagement with improperly seated pins in said channel, and means for urging said device into engagement with said improperly seated pins to effect the movement of said improperly seated pins into proper seated arrangement in said channel.

38. In a bowling pin spotting machine, mechanism for elevating bowling pins from the pit of a bowling alley, comprising a rotary disk comprising an annular peripheral channel, said channel having a circumferential pin supporting bottom section and spaced side flanges extending inwardly from said bottom section at right angles to the axis of rotation of said disk for holding pins on said bottom section with their longitudinal axes arranged substantially at right angles to the axis of rotation of said disk, means mounting said disk in said pit and transversely thereof, a pin receiving station, a pin discharge station, means for rotating said disk, means at said receiving station for delivering pins into said channel, means for seating and holding said pins against removal from said channel during their travel to said discharge station, and means operative in response to the arrival of each pin seated in said channel at said discharge station for discharging said pin from said channel.

39. In a bowling pin spotting machine for use with a bowling alley having a pit at one end thereof, and kickbacks at the sides of said pit, mechanism for elevating bowling pins from said pit to a discharge station, comprising a rotary member comprising a circumferential annular pin receiving and elevating channel extending about its axis of rotation, said channel having a generally U-shaped cross section and with the sides thereof extending radially inwardly towards the axis of rotation of said channel for receiving pins with their longitudinal axes substantially at right angles to the axis of rotation thereof, means mounting said rotary member in said pit and transversely thereof with the outer periphery of said channel extending closely adjacent said kickbacks, means for delivering pins into said channel, means for holding said pins in said channel against removal therefrom during the movement of said pins by said channel to said discharge station and operative in response to the rotation of said member and the movement of pins therewith to said discharge station for discharging said pins from said channel, and means for rotating said member to elevate pins held in said channel to said discharge station.

40. The invention defined in claim 39 including a pin receiving and orienting chute, means mounting said chute at said discharge station with a portion thereof located within and beneath said channel whereby pins discharged from said channel may fall into said chute, and means on said chute for orienting pins for butt end first discharge therefrom.

41. In an automatic bowling pin setting machine for use with a bowling alley having a pit at an end thereof, mechanism for elevating bowling pins from said pit comprising a traveling member, a plurality of pin supporting units mounted on said member, means for driving said member to travel said units to and from a pin receiving station in said pit and then through a pin discharge station remote from said receiving station, means for urging pins into said units at said receiving station, movable grippers mounted on said traveling member and spaced in accordance with the spacing of said units, mechanism for moving said grippers into gripping relationship with pins located in said units, and means for moving said grippers out of engagement with pins at said discharge station to effect the release of said pins from said units, said last-named mechanism and said last-named means including a gripper actuating cam for moving said grippers into gripping contact with pins in said units, said cam being positioned so that said grippers are held thereby in pin engaging position during only a selected part of the movement of said traveling member, said cam having a part so positioned that said grippers move successively out of engagement therewith to free said gripped pins at said pin discharge station.

References Cited in the file of this patent

UNITED STATES PATENTS

| | | |
|---|---|---|
| 1,190,645 | Hedenskoog | July 11, 1916 |
| 1,190,650 | Hedenskoog | July 11, 1916 |
| 1,190,651 | Hedenskoog | July 11, 1916 |
| 1,468,212 | Redfield | Sept. 18, 1923 |
| 1,524,241 | Hedenskoog | Jan. 27, 1925 |
| 1,557,177 | Lorenz et al. | Oct. 13, 1925 |
| 1,706,271 | Williams | Mar. 19, 1929 |
| 1,784,084 | Williams | Dec. 9, 1930 |
| 2,015,428 | Hedenskoog | Sept. 24, 1935 |
| 2,019,607 | Hedenskoog | Nov. 5, 1935 |
| 2,389,643 | Schmidt | Nov. 27, 1945 |
| 2,470,052 | Rundell et al. | May 10, 1949 |
| 2,531,167 | Simpson | Nov. 21, 1950 |
| 2,621,045 | Montooth | Dec. 9, 1952 |
| 2,676,016 | Whipple | Mar. 11, 1954 |
| 2,686,053 | Phillips | Aug. 10, 1954 |